United States Patent
Zittlau et al.

[19]

[11] Patent Number: 6,157,217
[45] Date of Patent: Dec. 5, 2000

[54] METHOD OF SYNCHRONIZING COMPUTING UNITS CONNECTED TO ONE ANOTHER VIA A BUS SYSTEM

[75] Inventors: Dirk Zittlau, Stöckelsberg; Bernd Pfaffeneder, Regensburg, both of Germany

[73] Assignee: Siemens Aktiengesellschaft, Munich, Germany

[21] Appl. No.: 09/327,695

[22] Filed: Jun. 8, 1999

[30] Foreign Application Priority Data

Jun. 9, 1998 [DE] Germany .......................... 198 25 825

[51] Int. Cl.[7] .................................................. H03K 19/00
[52] U.S. Cl. ............................................. 326/93; 710/129
[58] Field of Search ........................... 326/93, 86; 327/41, 327/141, 297; 368/10, 46; 395/280, 287, 290, 309; 710/129

[56] References Cited

U.S. PATENT DOCUMENTS

| | | | |
|---|---|---|---|
| 4,368,987 | 1/1983 | Waters | 368/46 |
| 4,886,981 | 12/1989 | Lentini et al. | 307/87 |
| 5,345,384 | 9/1994 | Przybyla et al. | 364/424.04 |
| 5,402,394 | 3/1995 | Turski | 364/10 |
| 5,483,230 | 1/1996 | Mueller | 340/825.06 |
| 5,524,213 | 6/1996 | Dais et al. | 395/200.17 |
| 5,588,123 | 12/1996 | Loibl | 395/287 |
| 5,661,700 | 8/1997 | Weppler | 368/46 |
| 5,748,923 | 5/1998 | Eitrich | 395/280 |
| 5,848,028 | 12/1998 | Burklin | 368/46 |
| 5,887,143 | 3/1999 | Saito et al. | 395/200.78 |

FOREIGN PATENT DOCUMENTS

4140017C2  1/1995  Germany .

*Primary Examiner*—David Nelms
*Assistant Examiner*—Gene N. Auduong
*Attorney, Agent, or Firm*—Herbert L. Lerner; Laurence A. Greenberg; Werner H. Stemer

[57] ABSTRACT

Computing units that are connected to one another via a bus system are synchronized in that two master units each cyclically output a time signal onto a data line of the bus system. The time signals are received by the computing unit to be synchronized. The unit checks the time signals with reference to its own time base. Particularly reliable synchronization of the computing units is ensured by this means.

13 Claims, 1 Drawing Sheet

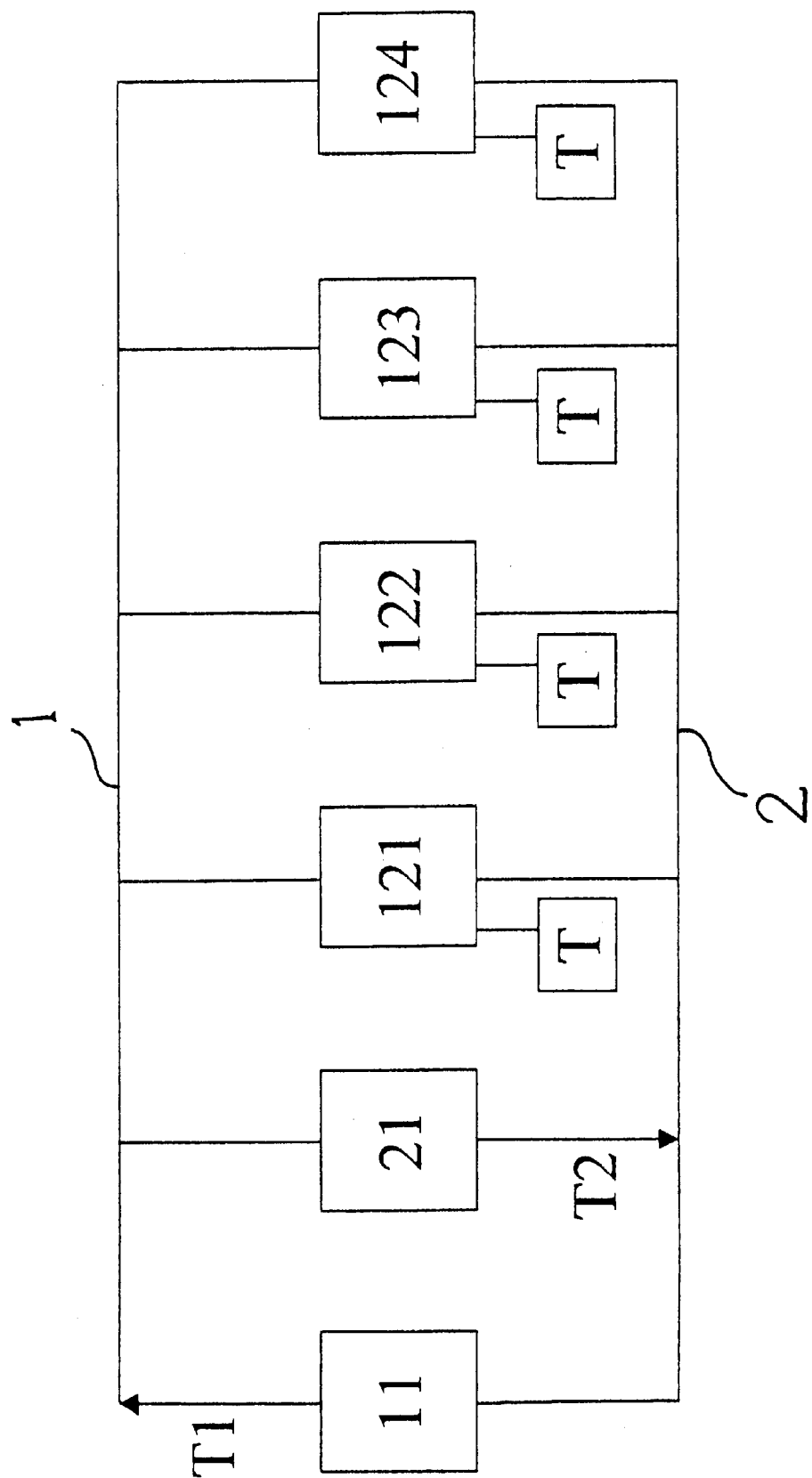

METHOD OF SYNCHRONIZING COMPUTING UNITS CONNECTED TO ONE ANOTHER VIA A BUS SYSTEM

BACKGROUND OF THE INVENTION

Field of the Invention

The invention lies in the electronics field, with special application in the automotive arts. Specifically, the invention relates to a method for synchronizing computing units connected to one another via a bus system.

In measurement, closed-loop and open-loop control technology, use is frequently made of computer systems provided with a multiplicity of computing units that are connected to one another via a bus system. Particularly in the case of applications in motor vehicle technology, for example in the case of an electro-mechanical braking system, the intention is to realize a control loop via a bus system. For this purpose, in the case of serial data transmission, all connected computing units must have a common time base.

German patent specification DE 41 40 017 C2 discloses a bus system with serial data exchange between computing units that communicate with one another. The computing units each have a dedicated timer system. Time information is exchanged and stored via the data bus. A common time base for the computing units is created by the time values of the local time bases being converted into the common time base in each case with time delays between a data signal delay and its processing being taken into consideration. A receiving computing unit can then convert the transmitted time value from the common time base to its local time base. There is no central clock supply for the individual computing units.

It has been known in the art to realize synchronization by means of a message on the bus. The arrival time of the message enables the receiving computing unit to be synchronized with the transmitter. The temporal resolution of this method is of the order of magnitude of the transmission time of the message. For a CAN bus, for example, this is approximately 200 microseconds at 500 kBit/s.

If a message is unexpectedly delayed, a message with a high priority may also be considerably delayed. This is not acceptable in safety applications in the automotive technology.

A further problem is that all computing units which receive the synchronizing message are synchronized with the transmitter even if the latter outputs an erroneous signal.

SUMMARY OF THE INVENTION

It is accordingly an object of the invention to provide a method for synchronizing computing units connected to one another via a bus system, which overcomes the above-mentioned disadvantages of the heretofore-known devices and methods of this general type and which assures that the computing units are synchronized in a particularly reliable manner.

With the foregoing and other objects in view there is provided, in accordance with the invention, a method of synchronizing computing units connected to one another via a bus system, the method which comprises the following steps:

cyclically transmitting, with a first master unit, a first time signal onto a data line of a bus system;

defining a second time signal in a given phase relationship with respect to the first time signal, and cyclically transmitting, with a second master unit, the second time signal onto a data line;

receiving the first and second time signals in computing units to be synchronized, wherein each of the computing units to be synchronized have a time base in a specific phase relationship with the first and second time signals; and checking the first and second time signals for correspondence with respect to the time base in the computing units.

Since two master units cyclically transmit time signals to the computing units, a receiving computing unit can ascertain, in the event of deviations from its own time base, whether the fault lies with its own time base or with one of the transmitting master units. Three synchronization signals are thus available to a computing unit in the case of fault-free operation.

In accordance with an added feature of the invention, the time signals are transmitted by the master units onto mutually separate data lines. This leads to particularly high reliability. If one line is subjected to interference, the computing units can be synchronized via the second line by the second master unit. Such a second line is frequently required in any case for safety reasons in motor vehicle technology, in order that two redundant data channels are available for the data transmission.

In accordance with another feature of the invention, the master units output the first and second time signals substantially simultaneously and with equal timing, i.e., without a phase shift. This is particularly expedient when different bus lines are used for outputting the time signals.

In accordance with an additional feature of the invention, each master unit receives on one of the data lines the time signal of the respectively other master unit, and the phase relationship of the time signals is checked with respect to one another. If a deviation from the predetermined phase relationship is ascertained, adjustment can be effected.

In accordance with a further feature of the invention, a phase relationship of the time signals is adjusted with the master units if a deviation in the predetermined phase relationship does not exceed a defined range.

In accordance with again an added feature of the invention, a fault message is output if one of a phase relationship between the time signals and the phase relationship between a time base of a respective one of the computing units and at least one of the time signals exceeds a defined margin.

In accordance with again an additional feature of the invention, a signal is output from the respective computing unit to the relevant master unit when the defined margin between the time signals is exceeded.

In accordance with again another feature of the invention, a time base of a respective computing unit is synchronized with the time signals, and a time signal or the time base is disregarded for the synchronization if a defined deviation with respect to the other two signals is exceeded.

In accordance with again a further feature of the invention, the time base of a respective computing unit is synchronized by taking into consideration the time signals and the time base, wherein the signal with a greatest margin from the respectively other signals are given least consideration.

In accordance with yet a further feature of the invention, the time signals are corrected at a respective receiving computing unit and/or a respective receiving master unit based on a transmission duration thereof.

A number of possibilities arise for temporal synchronization of the computing units and their time bases with the time signals of the master units. What is particularly preferred in this case is that, for the purpose of synchronization, a computing unit uses only those signals from the time signals it has received from the master units and from its own time base which do not exceed a defined deviation from the other two signals. In this case, the computing unit may either be synchronized with the average value of the two signals closest together or form an average value from all three synchronization signals, provided that no impermissible deviation of a signal is present.

As an alternative, the synchronization time can always be obtained from all three synchronization signals if weighting of in each case one synchronization signal is formed in dependence on the time difference with respect to the other two synchronization signals or with respect to a non-weighted average value.

Although a system having just two master units which emit time signals is particularly preferred, the invention can also be realized with additional master units.

One of the master units or computing units connected to the bus system may be a central control unit. For safety reasons, it is also possible for a plurality of central control units to be connected to the bus system, in particular to different data lines.

In accordance with a concomitant feature of the invention, the bus system is a CAN bus and, accordingly, the time signals are transmitted via CAN bus data lines. The advantages of the invention afford the greatest benefit in bus systems with serial data transmission.

Other features which are considered as characteristic for the invention are set forth in the appended claims.

Although the invention is illustrated and described herein as embodied in a method for synchronizing computing units connected to one another via a bus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a block diagram showing two CAN buses to which master units and computing units are connected.

DESCRIPTION OF THE PREFERRED EMBODIMENTS

Referring now to the sole FIGURE of the drawing in detail, there are seen two master units 11 and 21 and also computing units 121, 122, 123 and 124. The computing units 121–124 are microcontrollers, which are each connected to a data line 1 of a first CAN bus and to a data line 2 of a second CAN bus. The master unit 11 is additionally equipped with the function of a central control unit which controls the computing units 121 to 124. The central control unit controls the braking of a motor vehicle.

Each of the computing units 121 to 124 has its own time base T, which is an oscillator, in order to generate a synchronizing signal. The computing units 121 to 124 are in each case connected to a further, non-illustrated computing unit, which serves for the local control of a system on a motor vehicle, for example an electro-mechanical brake, and for the recording and outputting of measured values onto the bus system. In the exemplary embodiment, the computing units 121 to 124 operate merely as bus controller, although they could also undertake system control functions.

At the system start, the two master units 11 and 21 must be synchronized with one another in order to be available as time master for the bus system. For this purpose, one of the two master units, as master, predetermines a time signal T1. During that initialization phase, the other master unit functions as a slave and is synchronized with the predetermined time signal T1.

If the master unit functioning as slave in the start phase detects an errored time signal T1 a number of times in succession, then it outputs a message to the corresponding master unit. The master unit operating as slave synchronizes with the time signal T1 only if the time signal T1 of the master unit does not exceed a defined phase difference, in other words is within a capture range. Otherwise, the synchronization operation is repeated. In this case, the master unit previously operating as time master can assume the role of the slave.

If error-free synchronization of the two master units 11 and 21 is brought about, then the accuracy of the synchronization between the two units is limited to the fluctuations which occur during the propagation time of messages at the highest priority level. In the event of the occurrence of temporally limited errors which are not accumulated, for example a delay of one of the two time signals T1 or T2, this is tolerated by a capture range. However, if this capture range is exceeded, then it is necessary to repeat the start phase, during which one of the two master units is operated as slave.

If significant differences occur between the time measurements of the two master units, renewed synchronization of the master units is dispensed with. This is identified by the computing units 121 to 124. In this case, the computing units synchronize with the master unit which is still operating correctly.

After the successful conclusion of the start phase, the master unit 11 cyclically transmits the time signal T1 as synchronization signal or sync pulse to all the computing units, or nodes, connected to the data line 1. Likewise, the master unit 21 cyclically transmits the time signal T2, with the same timing, to all the computing units 121 to 124. To ensure that these time signals are transmitted, the latter have the highest priority.

In the computing units, three different instants occur with respect to each synchronization, namely the arrival time of the time signal T1 of the master unit 11 on the data line 1 of the bus, the arrival time of the time signal T2 on data line 2 and a local synchronization time predetermined by the respective time base T.

In the synchronous state of the network, that is to say after the end of the non-synchronous start phase, these three instants must be approximately identical, since the two master units and the respective computing unit must have measured the same time duration, within a tolerance range (capture range), since the last cycle (last synchronizing instant).

If the time measurement of a master unit or of a computing unit is erroneous, this can be ascertained in each case by the computing units by means of a comparison of the arrival times of the time signals T1 and T2 with the local synchronization time of the time base T.

From the three known synchronizing possibilities (time signal T1, time signal T2 and time base T), the respective computing unit selects those which are closest together with respect to time and synchronizes with their average value. A tolerance or capture range need not necessarily be provided in this case.

As an alternative, the respective computing unit can be synchronized with the average value of all three synchronizing instants. A tolerance or capture range is necessary in this case, in order to exclude a synchronizing signal from one of the three sources which is erroneous.

For the computing units 121 to 124, the synchronizing possibility is lost only when at least two sources for the synchronization signals (master unit 11, master unit 21, respective time base T) fail. It is possible, therefore, to refer to fail-safe temporal synchronization.

The synchronization of the computing units is effected particularly accurately if the arrival times of the time signals T1 and T2 are in each case corrected by their transmission duration.

We claim:

1. A method of synchronizing computing units connected to one another via a bus system, the method which comprises the following steps:

cyclically transmitting, with a first master unit, a first time signal onto a data line of a bus system;

defining a second time signal in a given phase relationship with respect to the first time signal, and cyclically transmitting, with a second master unit, the second time signal onto a data line;

receiving the first and second time signals of the first and second master units in each of first and second computing units to be synchronized, wherein each of the first and the second computing units to be synchronized have a time base in a specific phase relationship with the first and second time signals and each of the first and the second computing units to be synchronized do not transmit a time signal; and checking the first and second time signals of the first and second master units for correspondence with respect to the time base of each of the first and the second computing units.

2. The method according to claim 1, wherein the transmitting steps comprise transmitting the time signals with the master units onto mutually separate data lines.

3. The method according to claim 1, wherein the master units output the first and second time signals substantially simultaneously and with equal timing.

4. The method according to claim 1, which comprises receiving with each master unit on one of the data lines, the time signal of the respectively other master unit and checking the phase relationship of the time signals with respect to one another.

5. The method according to claim 1, which comprises adjusting a phase relationship of the time signals with the master units if a deviation in the predetermined phase relationship does not exceed a defined range.

6. The method according to claim 1, which comprises outputting a fault message if one of a phase relationship between the time signals and the phase relationship between a time base of a respective one of the computing units and at least one of the time signals exceeds a defined margin.

7. The method according to claim 6, which comprises outputting a signal from the respective computing unit to the relevant master unit when the defined margin between the time signals is exceeded.

8. The method according to claim 1, which comprises synchronizing a time base of a respective computing unit with the time signals, and disregarding a time signal or the time base for the synchronization if a defined deviation with respect to the other two signals is exceeded.

9. The method according to claim 1, which comprises synchronizing the time base of a respective computing unit by taking into consideration the time signals and the time base, wherein the signal with a greatest margin from the respectively other signals are given least consideration.

10. The method according to claim 1, which comprises correcting the time signals at a respective receiving computing unit based on a transmission duration thereof.

11. The method according to claim 1, which comprises correcting the time signals at a respective receiving master unit based on a transmission duration thereof.

12. The method according to claim 1, which comprises correcting the time signals at a respective receiving computing unit and a respective receiving master unit based on a transmission duration thereof.

13. The method according to claim 1, wherein the bus system is a CAN bus and the transmitting steps comprise transmitting the time signals via CAN bus data lines.

* * * * *